United States Patent [19]

Bushnell et al.

[11] 4,322,482

[45] Mar. 30, 1982

[54] ELECTROLYTE MATRIX FOR MOLTEN CARBONATE FUEL CELLS

[75] Inventors: Calvin L. Bushnell, Glastonbury, Conn.; Lawrence J. Bregoli, Southwick, Mass.; Craig R. Schroll, West Hartford, Conn.

[73] Assignee: United Technologies Corporation, Hartford, Conn.

[21] Appl. No.: 158,019

[22] Filed: Jun. 9, 1980

[51] Int. Cl.$^3$ .............................................. H01M 4/86
[52] U.S. Cl. ........................................... 429/41; 429/33
[58] Field of Search .................. 429/41, 33, 30, 46; 423/600; 106/39.5, 65, 73.4

[56] References Cited

U.S. PATENT DOCUMENTS

| | | | |
|---|---|---|---|
| 3,120,456 | 2/1964 | Broers | 429/41 |
| 3,160,527 | 12/1964 | Hess | 429/41 |
| 3,481,788 | 12/1969 | Hamlen et al. | 429/41 |
| 3,878,296 | 4/1975 | Vine et al. | 429/33 X |
| 4,009,321 | 2/1977 | Baker et al. | 429/46 |
| 4,079,171 | 3/1978 | Marianowski et al. | 429/46 |
| 4,216,278 | 8/1980 | Arendt et al. | 429/46 X |

*Primary Examiner*—Charles F. LeFevour
*Attorney, Agent, or Firm*—Stephen E. Revis

[57] ABSTRACT

Thru-cracks in the electrolyte retaining matrix of a molten carbonate fuel cell caused by thermal cycling of the cell between operating and room temperature are prevented by an improved matrix comprising a major proportion of submicron support particles and a minor proportion, perhaps only a few percent, of much larger crack attenuator particles. In one embodiment wherein the electrolyte is to be a binary lithium-potassium carbonates composition, the matrix comprises 90 volume percent submicron lithium aluminate support particles and 10 volume percent alumina crack attenuator particles with an average size of 100 microns.

10 Claims, No Drawings

ELECTROLYTE MATRIX FOR MOLTEN CARBONATE FUEL CELLS

DESCRIPTION

1. Technical Field

This invention relates to molten carbonate fuel cells and more particularly to a matrix used in the fuel cell for holding the electrolyte within the fuel cells.

2. Background Art

Molten carbonate fuel cells are well known in the art and are described, for example, in U.S. Pat. Nos. 4,009,321 and 4,079,171. The electrolyte in this type of cell is solid at room temperatures and liquid or molten at operating temperatures which generally range between 500° and 700° C. Some well known electrolytes of this type are the alkali metal carbonate compositions such as ternary lithium-potassium-sodium carbonates compositions and binary lithium-potassium, lithium-sodium, or potassium-sodium carbonates compositions. The electrolyte is disposed within a substantially inert matrix sandwiched between an anode and a cathode electrode. In addition to having structural integrity, the matrix, in combination with the electrolyte, must provide complete separation of the fuel and oxidant gases disposed on opposite sides thereof. The electrolyte and matrix combination is often referred to as an electrolyte tile. The matrix is usually made from submicron ceramic particles which are compatible with the fuel cell environment. For example, lithium aluminate is substantially inert to the ternary and binary carbonates compositions mentioned above, and may be used as the matrix material in cells incorporating those types of electrolytes.

The tiles are subject to great stress due to thermal cycling between room temperature and cell operating temperatures. The greatest stresses occur as the electrolyte passes from the liquid phase to the solid phase as the cell is shut down. This phase change occurs very rapidly and is accompanied by an equally rapid volume change resulting in a release of energy. The energy is often dissipated by the formation of large cracks which are continuous from one side of the tile to the other. The tile thus loses its ability to maintain gas separation and is no longer useful. The problems of thermal cycling are especially severe when using thin tiles which are desirable to minimize resistive losses.

There has been considerable effort in the prior art to improve the ability of the electrolyte matrix to withstand thermal cycling. Above-referred to U.S. Pat. No. 4,079,171 describes one effort in that direction. Other efforts have involved incorporating wire mesh screens within the tiles for added strength. The use of screens is expensive as well as being undesirable from a long term corrosion point of view; and they are particularly unattractive since a large number of them is required per matrix. Basically, none of the prior art strengthening techniques have proved to be adequate. In most cases the matrix develops a thru-crack after only one cycle, and the prior art strengthening techniques simply increase the number of cycles the cell can undergo before the damage becomes apparent through performance losses. In an unacceptably short period of time the cell ultimately becomes inoperative.

DISCLOSURE OF THE INVENTION

An object of the present invention is an improved molten carbonate electrolyte matrix.

Another object of the present invention is a molten carbonate electrolyte matrix which can withstand thermal cycling between cell operating temperatures and room temperatures without thru-cracks developing in the matrix.

Accordingly, an improved molten carbonates electrolyte matrix of the present invention comprises a major proportion of submicron support particles and a minor porportion of larger, crack attenuator particles, the crack attenuator particles and the support particles all being compatible with the cell operating environment.

The ceramic particles from which matrices of the prior art have typically been made are substantially all submicron in size. The small particle size is used to obtain the desired structural integrity and to increase the matrix's ability to maintain gas separation. Unfortunately, as has been discussed, these matrices have been unable to withstand thermal cycling. It has been discovered, however, that if the matrix includes even a small amount of much larger particles mixed in with the submicron particles, thermal cycling failures do not occur. More specifically, the presence of the larger particles results in thousands of discontinuous microcracks being formed throughout the matrix as it cools down from operating temperature to room temperature. Evidently, the stresses resulting from the electrolyte phase change and differential thermal expansion between components during cool down are relieved through the formation of this multitude of tiny discontinuous cracks, rather than by the formation of one or more large thru-cracks. Upon reheating to operating temperature the microcracks heal themselves such that, in tests conducted to date, no noticeable permanent damage occurs during a cycle. Therefore, the matrix can be continuously recycled with no detrimental effect.

BEST MODE FOR CARRYING OUT THE INVENTION

The matrix of the present invention is believed to be applicable to cells using molten carbonate electrolytes of any type, but the matrix is particularly useful in cells wherein the electrolyte composition is an alkali metal carbonates composition such as a ternary lithium-potassium-sodium carbonates composition, a binary lithium-potassium carbonates composition, a binary lithium-sodium carbonates composition, or a binary potassium-sodium carbonates composition.

The matrix itself is comprised of what is herein referred to as "support" particles and "crack attenuator" particles. The support particles comprise a major proportion by volume (but less than 100%) of the matrix and are substantially all submicron in size. That is, except for only a few percent which may be on the order of a micron in size, the rest are less than one micron. Preferably most are only a few tenths micron in size. The support particles may, of course, be made from any material compatible with the fuel cell environment in which it is to be used. Ceramics are presently the only known materials which are suitable as support particles, with lithium aluminate being the preferred material for the binary and ternary alkali carbonate electrolyte compositions discussed above. Non-fibrous prior art matrices were basically made entirely from support particles of this description plus reinforcing screens in some instances.

The crack attenuator particles, which are considerably larger than the support particles, can be made from the same material as the support particles, or any ceramic, metal or other material now known or hereafter discovered as being compatible with the fuel cell environment in which it will be used. Some materials known to be suitable as crack attenuator particles, particularly for the ternary and binary carbonate compositions mentioned above, are ceramics such as lithium aluminate ($LiAlO_2$) and alumina ($Al_2O_3$). A combination of lithium aluminate and alumina could also be used. Some metals, such as steels containing alumina or aluminum, may also be suitable, either because they are substantially inert in the electrolyte or because a passive or inert protective layer of material is formed over the particles during cell operation. Other metals, like copper, may be suitable only adjacent the anode electrode. On the other hand, stainless steel would corrode at the anode but may be suitable for use adjacent the cathode. To accommodate metals like copper and stainless steel, a bilayer matrix would probably be required.

The required size of the crack attenuator particles and the quantity necessary to result in the formation of this multitude of microcracks as opposed to thru-cracks can readily be determined by experimentation. Particles which are too small will yield a matrix with the same deficiencies as the prior art. Particles which are too large will, in sufficient quantities, significantly reduce matrix structural integrity and the matrix's ability to maintain gas separation. Too many of even the correct size particle can be harmful in the same way. It is believed that the size of the crack attenuator particles should average at least 25 microns, preferably average at least about 50 microns, and most preferably average at least 100 microns. It is also recommenced that the particles be no larger than about 300 microns. Crack attenuator particles in amounts as little as 5 volume percent of the matrix material and up to 30 volume percent have proved to be effective in preventing thru-cracks, although at 20 volume percent a slight cell performance penalty, in terms of increased electrical resistivity, would be expected based upon analytical analysis; and an even larger penalty would be expected for larger amounts.

EXAMPLE

Consider, as an exemplary embodiment of the present invention, a fuel cell wherein the electrolyte is a binary lithium carbonate. Potassium carbonate composition consisting of about 50 weight percent lithium carbonate and 50 weight percent potassium carbonate. The electrolyte tile for this cell was molded from a mixture comprising about 66 volume percent of the carbonates composition and a balance of particulate matrix material. The matrix portion was comprised of 90 volume percent substantially all submicron lithium aluminate support particles, and the balance, or 10 volume percent, alumina crack attenuator particles. The alumina particles were screened to an average of 100 microns in size with a range between 50 and 150 microns.

To make a tile 0.060 inch thick and 13.0 inch square 345 grams of a dry blend of electrolyte (in powder form), the lithium aluminate support particles, and the alumina crack attenuator particles, in the proportions indicated above, was prepared. The powder blend was loaded in a closed die mold and pressed at a pressure of 3500 psi at a temperature of 465° C. for one hour and then cooled to room temperature.

This tile was incorporated into a fuel cell and cycled between operating temperature (about 650° C.) and room temperature ten times with no thru-cracks being formed. The tests were not continued beyond this point. An examination of the tile during cell teardown inspection revealed a web-like system of tiny microcracks over the entire surface. Thermal cycling tests on an identical tile run outside the fuel cell revealed that each cycle produced a different pattern of microcracks, indicating that the cracks were healing themselves during reheating to cell operating temperatures. In contrast, tiles identical in every respect to the above tile, except that the matrix material consisted of substantially 100 percent submicron lithium aluminate support particles and no crack attenuator particles, when subjected to either a cell test or out of cell test was always found to have thru-cracks after the very first cycle.

Although the foregoing matrix was fabricated as part of a molded tile which included the electrolyte, matrices may also be fabricated separate from the electrolyte. In the former case the electrolyte may comprise between 50 and 70 volume percent of the tile. In the latter case the electrolyte, in molten form, would be added to the matrix at a later time and might constitute as little as 30 percent of the combination.

Thermal cycling test data for a variety of matrices is presented in Table I below.

TABLE I

| | | MATRIX MATERIAL DATA | | | | | | |
|---|---|---|---|---|---|---|---|---|
| | | Support Particle Data | | | Crack Attenuator Particle Data | | | |
| Matrix No. | Material Thickness (Inch) | Material | Size (Microns) | Vol. % | Material | Size (Microns) | Vol.% | Successfully Cycled? |
| 1* | .060 | $LiAlO_2$ | <1 | 100 | — | — | — | No |
| 2 | .060 | " | " | 90 | $LiAlO_2$ | 100–150 | 10 | Yes |
| 3 | .060 | " | " | 90 | $Al_2O_2$ | 100–150 | 10 | Yes |
| 4 | .060 | " | " | 95 | $Al_2O_3$ | 50–150 | 5 | Yes |
| 5 | .060 | " | " | 85 | $Al_2O_3$ | 100–150 | 15 | Yes |
| 6 | .015 | " | " | 90 | $Al_2O_3$ | 50–150 | 10 | Yes |

*Prior Art

In all cases the electrolyte was a binary lithium carbonate/potassium carbonate composition consisting of about 50 weight percent lithium carbonate and 50 weight percent potassium carbonate. In all cases except matrix 6 the ratio of electrolyte to matrix material was 66:34, by volume. For matrix 6 the ratio was 40:60. Matrices numbered 1 and 3 were tested both in and outside a cell; matrices 4 and 5 were only tested outside a cell; and matrices 2 and 6 were only cell tested. An outside the cell test consisted of simply heating a tile to fuel cell operating temperature and then cooling to room temperature. It was discovered in testing that if a test matrix survived the first thermal cycle without a thru-crack forming then it would survive any number of cycles. A bad matrix would always develop a crack during the first cycle. Therefore, for the matrices in Table I the test consisted of only one or two cycles. Matrix No. 1 is representative of the prior art. It was our previously best tile with the matrix consisting of 100 percent submicron lithium aluminate support particles reinforced with two fine mesh in-plane woven screens made from an alloy of aluminum-chromium-iron-nickel.

Although the invention has been shown and described with respect to the preferred embodiment thereof, it should be understood by those skilled in the art that various changes and omissions in the form and detail thereof may be made therein without departing from the spirit and scope of the invention.

We claim:

1. In a fuel cell utilizing a molten carbonate-type electrolyte and including a matrix for retaining said electrolyte, said matrix comprising submicron support particles of a material compatible with the electrolyte under cell operating conditions, the improvement comprising:
    wherein said matrix is a blend of at least 5.0 volume percent crack attenuator particles with a balance of said submicron support particles, said crack attenuator particles being of a material compatible with the electrolyte under cell operating conditions and having size sufficiently larger than said support particles and being present in sufficient quantity to result in the formation of a multitude of microcracks and no thru cracks in said matrix upon cool down of said matrix from operating to room temperature.

2. The improvement according to claim 1 wherein said support particles are ceramic particles and said crack attenuator particles are ceramic or metal particles.

3. The improvement according to claims 1 or 2 wherein no more than about 20 volume percent of said matrix particles are crack attenuator particles.

4. The improvement according to claim 3 wherein the average size of said crack attenuator particles is at least 50 microns.

5. The improvement according to claim 1 including an alkali metal carbonate electrolyte disposed in the matrix to the extent that between 30 and 70 volume percent of the combination is the said electrolyte.

6. The improvement according to claim 5 wherein said electrolyte is selected from the group consisting of a ternary lithium-potassium-sodium carbonates composition, a binary lithium-potassium carbonates composition, a binary lithium-sodium carbonates composition, and a binary potassium-sodium carbonates composition.

7. The improvement according to claim 1 or 6 wherein the average size of said crack attenuator particles is at least 25 microns.

8. The improvement according to claim 7 wherein said crack attenuator particles are ceramic or metal particles.

9. The improvement according to claim 7 wherein said support particles are lithium aluminate and said crack attenuator particles are selected from the group consisting of lithium aluminate particles, alumina particles, and a combination of lithium aluminate particles and alumina particles.

10. The improvement according to claim 7 wherein said electrolyte composition comprises between 50 and 70% of the tile volume.

* * * * *

UNITED STATES PATENT AND TRADEMARK OFFICE
CERTIFICATE OF CORRECTION

PATENT NO. : 4,322,482
DATED : March 30, 1982
INVENTOR(S) : CALVIN L. BUSHNELL ET AL It is certified that error appears in the above—identified patent and that said Letters Patent is hereby corrected as shown below:

Column 3, line 33: "recommenced" should be --recommended--.

Column 4, Table I: At the column entitled "Material", under the heading "Crack Attenuator Particle Data" of Matrix No. 3, "$Al_2O_2$" should be --$Al_2O_3$--.

Signed and Sealed this

Twenty-fifth Day of May 1982

[SEAL]

Attest:

Attesting Officer

GERALD J. MOSSINGHOFF
Commissioner of Patents and Trademarks